Dec. 22, 1925.
C. B. CARTER
1,566,820
PRODUCTION AND PURIFICATION OF HEXAMETHYLENETETRAMINE
Filed July 26, 1924
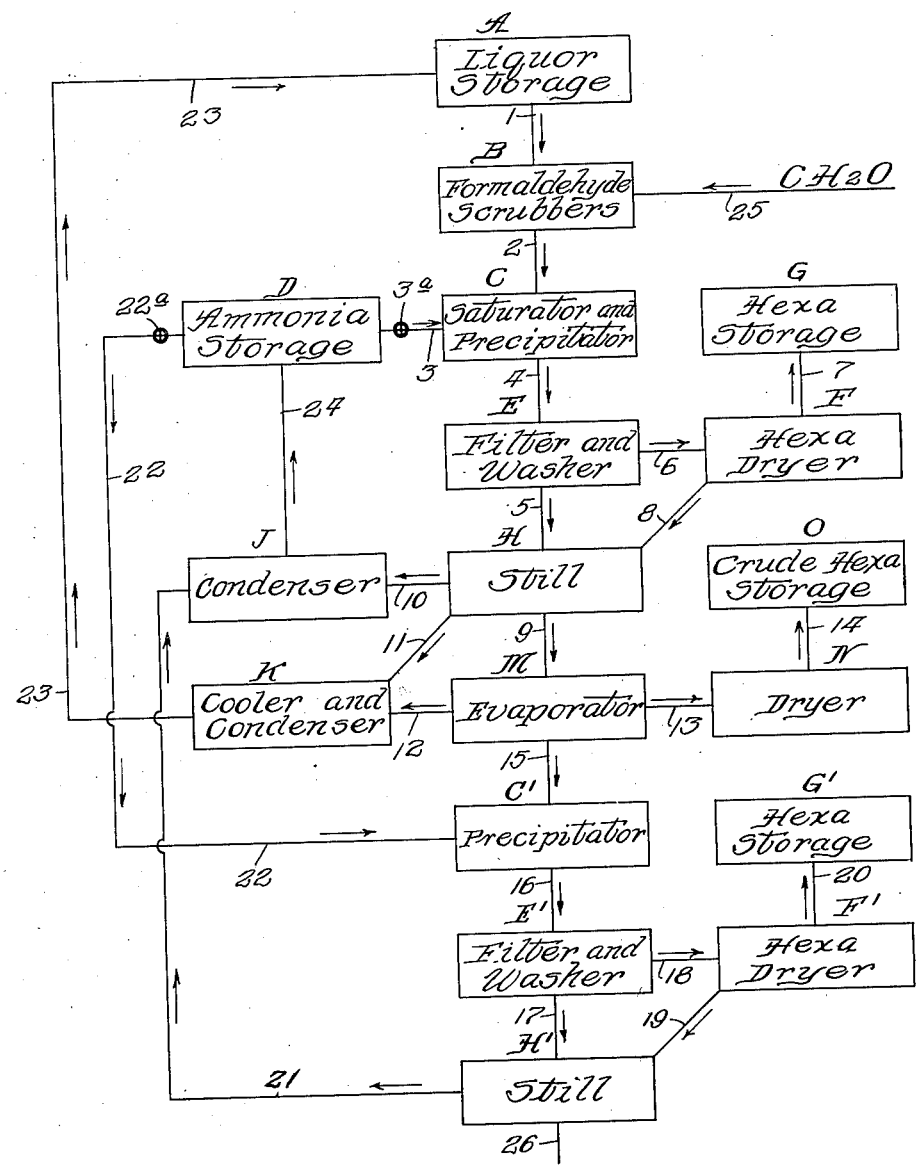
Inventor:
Carrie B. Carter,
By Byrnforth, Lee, Chritton & Wiles,
Attys.

Patented Dec. 22, 1925.

1,566,820

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

PRODUCTION AND PURIFICATION OF HEXAMETHYLENETETRAMINE.

Application filed July 26, 1924. Serial No. 728,462.

*To all whom it may concern:*

Be it known that I, CARNIE B. CARTER, a citizen of the United States, residing at Pittsburgh, in the county of Allegheny and State of Pennsylvania, have invented a new and useful Improvement in the Production and Purification of Hexamethylenetetramine, of which the following is a specification.

This invention relates particularly to a method whereby hexamethylenetetramine, in practically pure form, may be produced in a comparably inexpensive manner. In accordance with the invention, substantially pure hexamethylenetramine may be readily prepared from crude hexamethylenetetramine; or the crude hexamethylenetetramine may be produced from a reaction between formaldehyde, usually containing impurities, and ammonia, and the pure hexamethylenetetramine may be recovered from the crude product thus produced.

The well-known reaction between formaldehyde and ammonia may be represented by the following equation:

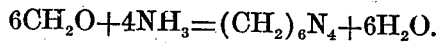

Commercially, hexamethylenetetramine is formed by the reaction indicated by adding concentrated aqueous ammonia to a 40% formalin solution. A solution of hexamethylenetetramine prepared in this way contains about fifteen or sixteen grams hexamethylenetetramine per 100 cc. of solution, whereas the saturation value is about 52 grams per 100 cc. of solution.

To recover hexamethylenetetramine from the rather weak solution resulting from the commercial practice noted, it is necessary to evaporate water and bring the product to dryness, in which case the hexamethylenetetramine is contaminated with impurities existing in the formalin employed, and thus requires purification. An alternative procedure is to evaporate the original solution to the point where the bulk of the hexamethylenetetramine crystallizes out of solution, separate this product from the mother-liquor, wash with water, and evaporate the combined wash-water and mother-liquor to dryness, in order to recover the remainder of the hexamethylenetetramine in impure form. It will be noted that either method requires the evaporation of the water, and this constitutes a large proportion of the expense involved in the production of hexamethylenetetramine.

According to the present process, the necessity for resorting to evaporation is largely obviated, and the cost of production of substantially pure hexamethylenetetramine is greatly reduced. The improved result is obtained by the systematic use of ammonia in the manner hereinafter set forth. For illustration, it is possible to very greatly reduce the solvent power of water for hexamethylenetetramine by introducing gaseous ammonia into the solution of hexamethylenetetramine. This principle is utilized in the process herein described, in which ammonia is employed to cause the precipitation of hexamethylenetetramine from aqueous solutions.

In a saturated solution of hexamethylenetetramine, the concentration of hexamethylenetetramine amounts to approximately 52 grams per 100 cc. of solution. As gaseous ammonia is introduced into the solution, hexamethylenetetramine is precipitated, depending upon the amount of ammonia introduced. In this manner, the hexamethylenetetramine remaining in solution may be reduced by a substantially uniform sliding scale as the ammonia concentration is increased. For example, where the ammonia concentration is about 18.4 grams per 100 cc. of solution, the hexamethylenetetramine concentration is about 22.2 grams per 100 cc. of solution; and where the ammonia concentration is about 35.7 grams of 100 cc. of solution, the hexamethylenetetramine concentration is about 6.4 grams per 100 cc. This latter ammonia concentration represents about the lowest point of concentration obtainable in aqueous solution. In liquid ammonia, the point of saturation is about 1.3 grams of hexamethylenetetramine per 100 cc.

In the practice of the process, the work is carried on in aqueous solutions of hexamethylenetetramine, and it is possible to so reduce the point of saturation by surcharging the solution with ammonia as to "salt out", or precipitate, in the neighborhood of 90% of the hexamethylenetetramine in a saturated aqueous solution.

The accompanying drawing illustrates, diagrammatically, apparatus which may be employed in practicing the improved process. The invention may be explained conveniently by making reference to the drawing, which illustrates the manner in which hexamethylenetetramine may be formed by reaction between formaldehyde and ammonia, and separation of purified hexamethylenetetramine may be effected by the proper use of ammonia, by employing the ammonia to lower the point of concentration and crystallize out the bulk of the hexamethylenetetramine. It may be understood that the principle may be employed, regardless of whether or not the solution of hexamethylenetetramine is, in the first instance, a concentrated solution.

Referring to the drawing, A represents a liquor storage-tank, which may, in the first instance, contain pure water, but which later, in the operation of the process, contains a dilute aqueous solution of hexamethylenetetramine; B, a formaldehyde tank, or, if desired, a formaldehyde scrubber; C, a saturator and precipitator, in which ammonia gas is introduced into the formaldehyde solution and neutralizes the formaldehyde, thus forming hexamethylenetetramine, and where the liquor is saturated with ammonia gas to cause precipitation of hexamethylenetetramine; D, an ammonia storage-tank, which may contain liquid ammonia; E, a filter and washer, which may comprise either an ordinary filter or a centrifuge apparatus; F, a hexamethylenetetramine dryer; G, a hexamethylenetetramine storage chamber; H, a still receiving the liquor from the device E; J, a condenser receiving ammonia gas from the still H, and from which ammonia is returned to the storage-tank D; K, a cooler and condenser receiving water and hexamethylenetetramine in dilute solution from the still; M, an evaporator, in which excess water (water formed by reaction and water introduced for washing purposes) may be evaporated; N, a dryer for crude hexamethylenetetramine taken from the evaporator; O, a storage chamber for crude hexamethylenetetramine; C', a saturator and precipitator, which may receive a concentrated solution of crude hexamethylenetetramine from evaporator M, if it be desired to purify the hexamethylenetetramine contained in solution in the chamber M; E', a filter and washer receiving the material from the chamber C'; H', a second still; F', a dryer for hexamethylenetetramine; G', a storage chamber for hexamethylenetetramine.

The lines 1–25 inclusive represent connections or routings for materials.

As indicated above, the tank A may be initially filled with pure water; but when the system is in operation, it becomes filled with a dilute solution of hexamethylenetetramine. The line 25 indicates the source of formaldehyde; and the formaldehyde scrubbers may be included in the system, being represented by the chamber B. In the preferred method of operation, the formaldehyde solution, containing hexamethylenetetramine in dilute solution, may pass from the scrubbers B to the chamber C, which may be water cooled, if desired. In the chamber C, gaseous ammonia is passed into the formaldehyde-dilute hexamethylenetetramine solution in sufficient quantity to neutralize the formaldehyde and convert it into hexamethylenetetramine and also in sufficient excess to saturate the solution, thus causing precipitation of the hexamethylenetetramine substantially as it is formed. The material is then passed to the device E where filtering, or centrifuging, is effected and the prcipitate washed. The washed precipitate is then transferred to the dryer F, where the purified hexamethylenetetramine is dried, and then passed to storage G. The liquor is passed to the still H, where the ammonia is distilled off and passes through line 10 to the condenser and cooler J, and thence back to the storage-tank D. A portion of the liquor from still H may pass from the still through line 11 to the cooler and condenser K, and may thence be returned through line 23 to the liquor storage-tank A. Another portion of the liquor may pass from still H through line 9 to evaporator M, where excess water may be distilled off. If desired, the evaporator M may be so operated as to drive off most of the water, and any ammonia entrapped may pass through line 12 to the condenser K. The crude hexamethylenetetramine obtained in evaporator M may be transferred to dryer N, may be completely dried there, and may then be transferred to the storage chamber O.

If desired, however, in evaporator M, only sufficient water may be evaporated to leave a concentrated solution of crude hexamethylenetetramine, which may be transferred or pass through line 15 to the saturator C', where ammonia may be introduced through line 22 to saturate the liquor with ammonia and cause precipitation of the bulk of hexamethylenetetramine still contained in the liquor. The materials may then pass from chamber C' through line 16 to the filter and washer E', from which the hexamethylenetetramine may be transferred by line 18 to the second dryer F', and the liquor may pass through line 17 to the second still H'. From the still H', ammonia may pass through line 21 to the condenser J thence to the ammonia storage-tank D. From the dryer F', vapors and ammonia may pass to the still H'.

Any residue in the second still H' may be discarded, or discharged, by line 26. The lines 3 and 22 may be equipped with reducing valves 3ª and 22ª, respectively, to enable ammonia to escape and pass at reduced pressure, in gaseous form, into the saturating and precipitating devices C and C'.

From the description given, it will be understood that hexamethylenetetramine, in pure form, may be produced economically from the crude hexamethylenetetramine which results from the neutralizing of formaldehyde containing impurities. The neutralizing of the formaldehyde is effected by means of gaseous ammonia. As the ammonia passes into solution, heat is evolved. Therefore, it is desirable to cool the chambers C and C'. It may be stated, however, that the process may be operated without resorting to any considerable cooling, by employing sufficient pressure. In other words, the gaseous ammonia will perform its function through any reasonable range of temperatures.

It is to be noted that the system can be operated with substantially a closed circuit; that excess ammonia may be employed to lower the point of saturation of the liquor, and may then be distilled off and recovered for reuse; that a relatively dilute solution of hexamethylenetetramine may be returned to the storage-tank A; and that the saturation point for hexamethylenetetramine may be so lowered in the chamber C as to cause hexamethylenetetramine, corresponding with all which is formed in excess of that required for saturation at the lowered saturation point to be precipitated. Thus, it follows that the bulk of the hexamethylenetetramine which, by this system, is procured in pure form, is obtained as a result of a "salting out" process, due to the lowering of the point of saturation for hexamethylenetetramine effected by the use of excess ammonia; and it follows, further, that large economies are effected by reason of the fact that the ammonia can be readily distilled, while the expense of evaporating large quantities of water is obviated. Moreover, the system lends itself to the production of the hexamethylenetetramine in the first instance by the introduction of gaseous ammonia into the formaldehyde. In other words, the ammonia need not be introduced in aqueous solution, and so it is possible to avoid, in a large degree, excessive dilution with water.

It will be readily understood that steps utilized in the process of forming and recovering hexamethylenetetramine, as described above, may be employed advantageously in the purification of crude hexamethylenetetramine, obtained from any source. Thus, crude hexamethylenetetramine may be dissolved in sufficient water to form a strong or saturated solution; this solution may be maintained cooled and saturated with ammonia gas, thus precipitating the bulk of the hexamethylenetetramine; and the precipitated hexamethylenetetramine may then be washed with saturated aqueous ammonia and dried. Very large yields of high quality hexamethylenetetramine can be obtained from very crude products in this way. Thus, it is practicable to recover most of the hexamethylenetetramine in very pure form. The remaining impure hexamethylenetetramine may be subjected to repetitions of the method until practically all of the hexamethylenetetramine has been recovered in pure form, and the remaining impurities may be discarded.

It may be added that the hexamethylenetetramine precipitated in the process is in fairly large crystalline form. Such precipitation continues as long as ammonia is taken up or absorbed by the solution. It has been found that a pure white product can be procured from crude hexamethylenetetramine formed by combining ammonia with an impure, yellowish colored, solution of formaldehyde.

The foregoing detailed description has been given for clearness of understanding only, and no unnecessary limitations should be understood therefrom, but the appended claims should be construed as broadly as permissible, in view of the prior art.

What I regard as new and desire to secure by Letters Patent, is:

1. In the production of hexamethylenetetramine, the step which comprises introducing ammonia into a solution of hexamethylenetetramine and thus lowering the saturation point and causing hexamethylenetetramine to be precipitated.

2. In the production of hexamethylenetetramine, the steps which comprise introducing ammonia into a solution of hexamethylenetetramine and thus lowering the saturation point and causing hexamethylenetetramine to be precipitated; separating and recovering the precipitated hexamethylenetetramine.

3. In the production of hexamethylenetetramine, the steps which comprise introducing ammonia into a solution of hexamethylenetetramine and thus lowering the saturation point and causing hexamethylenetetramine to be precipitated; separating the precipated hexamethylenetetramine and washing it with water charged with ammonia.

4. The process of producing hexamethylenetetramine which comprises: charging into a chamber a dilute solution of hexamethylenetetramine, formaldehyde, and sufficient ammonia to combine with the formaldehyde and form additional hexamethylenetetramine and also to lower the point of saturation and cause the precipitation of hexamethylenetetramine.

5. The process which comprises: mixing formaldehyde, a dilute solution of hexamethylenetetramine, and ammonia, in sufficient quantity to neutralize the formaldehyde and provide an excess of ammonia to lower the saturation point of the solution; and subjecting the mixture to cooling action during the operation of the process.

6. The process of producing hexamethylenetetramine which comprises: introducing into an aqueous solution of formaldehyde ammonia gas in sufficient quantity to neutralize the formaldehyde and form hexamethylenetetramine and to provide an excess of ammonia to lower the point of saturation of the solution of hexamethylenetetramine, thereby causing hexamethylenetetramine to be precipitated; separating the precipitate from the solution; distilling off ammonia; and reemploying the mother liquor in conjunction with formaldehyde and ammonia in the continuation of the process.

7. The process of producing hexamethylenetetramine which comprises: delivering a dilute solution of hexamethylenetetramine to a formaldehyde solution, substantially saturating the mixture with ammonia gas, thus forming additional hexamethylenetetramine, and lowering the point of saturation; separating the precipitate from the filtrate and washing the precipitate; drying the precipitate: distilling ammonia from the mother liquor; and returning the mother liquor for admixture with fresh formaldehyde and ammonia.

8. In a process of the character set forth, the steps which comprise: producing a substantially saturated aqueous solution of hexamethylenetetramine; and substantially saturating said solution with ammonia to cause precipitation of the hexamethylenetetramine held in solution.

9. The process which comprises: mixing a dilute aqueous solution of hexamethylenetetramine and formaldehyde, surcharging the solution with ammonia to form additional hexamethylenetetramine and to cause precipitation of hexamethylenetetramine, separating the precipitate from the mother liquor, washing the precipitate in water charged with ammonia and drying the precipitate; distilling ammonia from the mother liquor; and removing water from the system to compensate for water formed in the reaction and introduced for washing purposes.

10. A process of the character set forth comprising: saturating a solution of formaldehyde with ammonia gas while maintaining the temperature against substantial increase, the ammonia being used in sufficient quantity to convert the formaldehyde into hexamethylenetetramine and then cause precipitation of hexamethylenetetramine; separating the precipitate from the mother liquor; washing and drying the precipitate; distilling the ammonia from the mother liquor; returning a portion of the mother liquor to mix with a fresh formaldehyde solution; and evaporating water from a portion of the mother liquor to yield crude hexamethylenetetramine.

11. A process of the character set forth comprising: saturating a solution of formaldehyde with ammonia gas while maintaining the temperature against substantial increase, the ammonia being used in sufficient quantity to convert the formaldehyde into hexamethylenetetramine and then cause precipitation of hexamethylenetetramine; separating the precipitate from the filtrate; washing and drying the precipitate; distilling the ammonia from the filtrate; returning a portion of the filtrate to mix with a fresh formaldehyde solution; evaporating water from a portion of the filtrate and leaving a substantially saturated solution of crude hexamethylenetetramine; surcharging said last-named solution with ammonia and thus causing precipitation of hexamethylenetetramine; and washing and drying the precipitate last referred to.

CARNIE B. CARTER.